April 28, 1964 G. GLAZ 3,131,316

THRESHOLD CIRCUIT UTILIZING SERIES CAPACITOR-DIODE COMBINATION AND EMPLOYING DIODE CLAMP TO MAINTAIN INFORMATION TRANSMISSION

Filed Dec. 22, 1961

INVENTOR.
GIDEON GLAZ
BY John V. Regan
Attorney

United States Patent Office 3,131,316

Patented Apr. 28, 1964

3,131,316

THRESHOLD CIRCUIT UTILIZING SERIES CAPACITOR-DIODE COMBINATION AND EMPLOYING DIODE CLAMP TO MAINTAIN INFORMATION TRANSMISSION

Gideon Glaz, Levittown, Pa., assignor to Radio Corporation of America, a corporation of Delaware Filed Dec. 22, 1961, Ser. No. 161,719

7 Claims. (Cl. 307—88.5)

This invention relates generally to amplifier circuits, and particularly to a circuit especially suitable for amplifying and for converting to digital form the useful output signal derived from a photosensitive device.

Photosensitive devices are used in digital computers, for example, as transducers for reading or sensing information appearing as perforations in record cards, paper tape and the like. These devices also are used as sensing elements in automatic document reader systems wherein information appearing as human language characters and/or symbols or their coded equivalents are printed or otherwise recorded in visible form on a recording medium. It generally is desired that the output signals provided by the reader be digital in form, having a first level or amplitude when information is present and sensed and having a second, different level or amplitude when no information is sensed. However, the intensity of the light supplied to a photosensitive device may vary from one item of information to another due to variations in print density, size of perforations and other factors. Moreover, the intensity of the light supplied to a photosensitive device may vary with time in the absence of sensed information. In the case of a perforated record member, for example, the latter variations in light intensity may arise from nonuniformities in the thickness or color of the record member, oil or dirt spots on the record member from repeated handling, creases and the like. These latter variations in light intensity represent undesired light signals and may be considered to be "light noise."

It is one object of the invention to provide a circuit which produces a first output when the input changes by more than a predetermined amount, and which produces a second output when the input changes by less than the predetermined amount, the predetermined amount of change being greater than that occasioned by the maximum noise signal input.

It is another object of this invention to provide an improved circuit for converting variable amplitude input signals to digital output signals, which circuit comprises a threshold amplifier A.-C. coupled to the output of a substantially linear amplifier.

A problem often encountered in photosensitive amplifier circuits is that the recording medium may be stopped in a position wherein the photosensitive device receives maximum illumination for a long period of time. In the event that A.-C. coupling is used in the related circuitry, the circuitry may become "paralyzed" due to undesired charging or discharging of the coupling element, and the circuit may fail to respond to the first few input changes following the commencement of movement of the record medium. The problem of paralysis may occur in apparatus for reading printed matter if the document is stopped in a character reading position, and may be present in general in any A.-C. coupled circuit designed to receive input signals of a first duration when signals having a greater duration are applied to the input.

Accordingly, it is another object of the invention to provide an improved circuit of the type described which does not become paralyzed when an input signal is applied for a longer than usual duration.

Briefly stated, the invention includes a first electron control device for receiving input signals and a second electron control device A.-C. coupled to the output of the first electron control device. The coupling arrangement includes a capacitor and a unidirectional conducting device serially connected, in the order named, between the output electrode of the first control device and the control electrode of the second control device. A bias circuit connected at the junction of the capacitor and the unidirectional device is used to apply a voltage having a value to normally reverse bias the unidirectional device. The bias voltage level is made larger than the change in voltage which appears at the junction aforesaid in response to the maximum amplitude noise signal applied at the control electrode of the first control device.

A second unidirectional conducting device may be connected in the bias circuit and poled in a direction to rapidly restore the D.-C. level at the junction following the termination of an input signal of longer than normal duration, thereby preventing paralysis of the circuit. When the circuit is used in conjunction with a photosensitive element, the latter element is connected in the control input circuit of the first electron control device for varying the bias on the first control device in response to received light signals.

Figures 1, 2, 3:
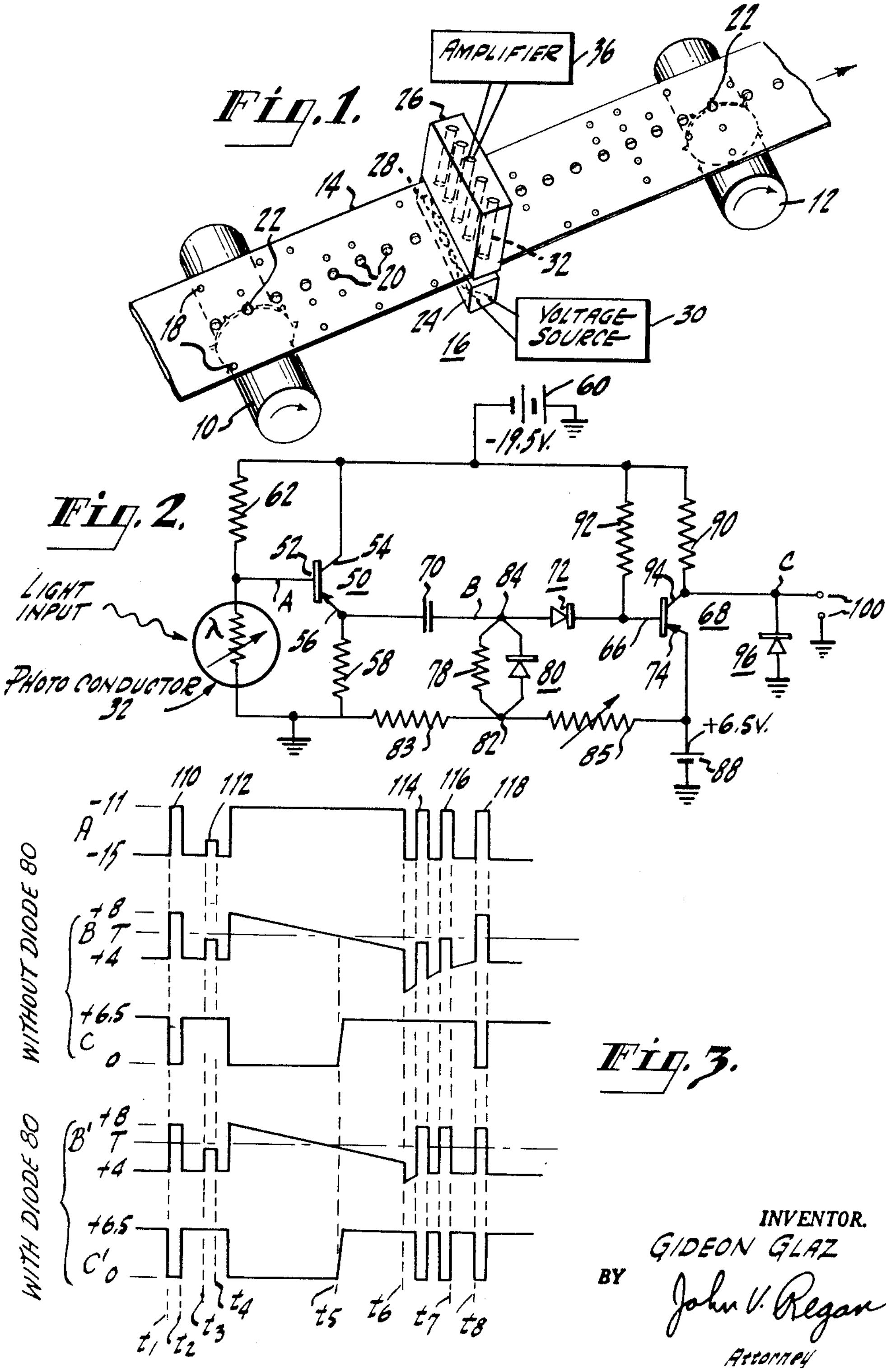
FIGURE 1 is a simplified diagram of a punched paper tape reader system.
FIGURE 2 is a schematic diagram of an improved amplifier circuit according to the invention.
FIGURE 3 is a set of waveforms useful in describing the operation of the amplifier.

The circuit of the invention is particularly suitable for amplifying the output of a photosensitive device, although it is not limited in use thereto. The photosensitive device, which may be a photoconductor or a photovoltaic cell, for example, may be an output transducer in the reading station of an equipment for sensing perforations in a paper tape, and will be so described by way of illustration. A partial view in perspective of such an equipment is illustrated in FIGURE 1.

In FIGURE 1, pair of sprocket wheels 10, 12 transports a perforated tape 14 past a reading station 16, from an input storage reel (not shown) to an output storage reel (not shown). Information characters are recorded on the tape 14 as patterns of perforations 18, and each character is recorded in a row perpendicular to the direction of tape 14 travel. A four unit code is illustrated in the system of FIGURE 1, whereby any of sixteen different characters may be recorded. Centrally located on the tape 14 and spaced equally along the length thereof are sprocket holes 20. Each of the wheels 10 and 12 has peripheral sprocket teeth 22 which are angularly displaced to project through the sprocket holes 20 in the tape 14 and drive the tape 14 as the wheels 10 and 12 rotate. Each perforation pattern representing a recorded character is aligned with a different one of the sprocket holes 22, and the sprocket holes 22 may be sensed at the reading station 16 to provide timing pulses for gating the character information sensed at the reading station 16.

The reader station 16 comprises a first unit 24 and a second unit 26, separated by a space or channel through which the tape 14 passes. The first unit 24 houses a lamp 28 which, when energized from an external source 30, illuminates the tape 14 from the underside thereof. The other unit 26 houses a number of photosensitive devices 32, five in the present example, one for sensing light passing through the sprocket holes 22 and four others for sensing light passing through the character information perforations 18. The photosensitive devices 32 are aligned in a row normal to the direction of tape 14 travel, whereby an entire character is sensed at one time.

The positions of the units 24 and 26 may be reversed if it is so desired.

The photosensitive devices 32 receive some light in the absence of a perforation or hole inasmuch as the tape 14 is not perfectly opaque. The normal light input to a photosensitive device in the absence of a perforation may be considered the low level input. This light input may vary as the tape 14 is moved due to nonuniformities in the thickness and composition of the tape 14, creases, oil stains and dirt marks on the tape 14 due to repeated handling and use, etc. These variations in light supplied to a photosensitive device 32 absent a perforation are undesired light signals and may be thought of as "light noise." It is desirable that these light noise signals be suppressed or otherwise distinguished from the light signals received by a photosensitive device 32 when a perforation passes between the lamp 28 and the device 32. The light directed to a photosensitive device 32 in the latter case is more intense, relatively speaking, and a relatively larger change in voltage, current, or resistance then is experienced, depending upon the type of photosensitive device employed. This intense light input, which may be considered a high level input, also may vary from perforation to perforation due to possible variations in the sizes of the perforations and other factors. In any case, however, a high level input signal should produce a greater change in the output of a photosensitive device 32 than does a light noise signal. The output of each photosensitive device 32 is supplied to a separate amplifier 36, only one of which is illustrated in the drawing.

The improved amplifier circuit according to the invention is illustrated schematically in FIGURE 2. This circuit receives the output of a photosensitive device 32 and provides an output having a first amplitude whenever either light noise or light input of the aforementioned low value or level is applied to the photosensitive device 32, and provides an output having a second different amplitude whenever a light input signal of the aforementioned high level is applied. The photosensitive device 32 may be, for example, a photoconductor, that is, a light sensitive, variable impedance device. The impedance of the device 32 varies inversely as a function of the light input intensity.

The circuit comprises a first electron control device 50 having a control electrode 52, a common or input electrode 54 and an output electrode 56. In particular, the electron control device 50 may be a PNP transistor, as illustrated, connected as an emitter follower, in which case the base, collector and emitter electrodes correspond to the control 52, common 54 and output 56 electrodes, respectively. A resistor 58 is connected between the emitter electrode 56 and a point of reference potential, illustrated schematically by the conventional symbol for circuit ground. The collector electrode 54 is connected directly to the negative terminal of a bias supply, illustrated as a battery 60, the positive terminal of which is grounded. The photoconductor 32 and a resistor 62 are serially connected, in the order named, between circuit ground and the negative terminal of the battery 60. The base electrode 52 is connected to the ungrounded terminal of the photoconductor 32. The voltage at the output or emitter electrode 56 follows the voltage at the base electrode 52 inasmuch as the transistor 50 is operated as an emitter follower. The base 52 voltage, in turn, varies directly as a function of the light input to the photoconductor 32, although the relationship may not be linear over a wide range. However, the transistor 50 always conducts and operates substantially as a class A linear amplifier because of the particular base 52 biasing arrangement.

The output of transistor 50 is A.-C. coupled to the input of a second electron control device 68, illustrated as a second PNP transistor. The coupling network includes a capacitor 70 and a unidirectional device 72 serially connected, in the order named, between the emitter electrode

56 and the control or base electrode 66. The unidirectional conducting device 72, which may be a germanium or silicon diode, is poled with its easy current flow direction in opposition to the direction of forward base 66-emitter 74 current flow. A resistor 78 and a second unidirectional conducting device 80 are connected in parallel between a junction point 82 and the junction 84 of the capacitor 70 and first diode 72. The second unidirectional conducting device 80, which also may be a germanium or silicon diode, is poled with its easy current flow direction opposing the easy current flow direction of the first diode 80 with respect to current supplied at the junction 84.

A positive bias is applied at the junction point 82 for reasons which will be described hereinafter. This bias could be supplied directly by a battery (not shown) connected between the point 82 and ground. However, the bias preferably is supplied by a voltage divider comprising resistors 83 and 85 connected serially between ground and the positive terminal of the battery 88. This arrangement has the advantage that it saves the expense of an additional power supply. Also, one of the resistors, resistor 85 for example, may be made variable to provide a simple and convenient means for adjusting the bias and setting the threshold of the transistor 68. The variable bias also could be provided by a single resistor (not shown) having a sliding tap. The dynamic voltage at the junction 82 is substantially constant irrespective of changes in input signal when the resistor 78 is selected to have a high resistance value relative to the resistances of the resistors 83 and 85.

The second transistor 68 is operated as a switch, as will be apparent as the discussion proceeds. The emitter electrode 74 of this transistor 68 is connected directly to the positive terminal of a battery 88. The negative terminal of the battery 88 is grounded. A resistor 90 and a resistor 92 are connected between the negative terminal of battery 60 and the collector 94 and base 66 electrodes, respectively. A clamp diode 96 has its anode grounded and its cathode connected to the collector electrode 94. The output of the circuit may be derived across a pair of output terminals 100, one of which is grounded and the other of which is connected directly to the collector electrode 92 and to the cathode of the clamp diode 96.

The resistance of the photoconductor 32 is high, relatively speaking, when the light input is low, and is low, relatively speaking, when the light input is high. The voltage at the base electrode 52 is low and high, respectively, corresponding to these two conditions by virtue of voltage divider action. The voltage at the emitter electrode 56 follows the voltage at the base electrode 52. The value of the resistor 62 is selected to provide a desired quiescent bias at the base 52.

The base electrode 66 is connected to the negative bias source 60, whereby the transistor 68 conducts when the input diode 72 is reverse biased. The resistor 92 is selected so that sufficient forward base current normally is supplied to the base 66 to bias the transistor 68 in the full "on" condition. The voltage at the base 66 then is only slightly negative relative to the emitter 74 voltage. The voltage at the junction point 82 is less positive than the emitter 74 voltage by an amount dependent upon the relative values of the resistors 83 and 85. The resistors 83 and 85 are selected so that the voltage at the junction 82 is negative with respect to the voltage at the base 66 when transistor 68 conducts, and the input diode 72 is reverse biased by an amount equal to the difference between the base 66 and the junction 82 voltages. This potential difference may be adjusted by varying either the resistor 83 or the resistor 85 and, in either case, is adjusted to provide a threshold which must be exceeded before the diode 72 becomes forward biased to turn off the transistor 68.

The time constant of the capacitor 70 and the resistor 78 is long compared to the duration of a normal light input signal. Very little current normally flows through the resistor 78 when the voltage at the emitter electrode 56 is changed. In general, the capacitor 70 charges to a value equal to the difference between the quiescent operating potentials at the emitter 56 and the junction point 84 (also the junction 82). Assume by way of example that the normal quiescent operating voltage at the emitter 56 is $-V_e$ volts and the voltage at the junction 82 (and the junction 84) is $+V_j$ volts. Capacitor 70 then normally is charged to $V_e+V_j$ volts. Assume further that the maximum light noise input to the photoconductor 32 causes the voltage at the emitter 56 to change by an amount $\Delta V$. This change in voltage $\Delta V$ is coupled by the capacitor 70 to the junction 84 at the anode of the input diode 72, and raises the voltage at the junction 84 to $V_j+\Delta V$ volts. The values of the resistors 83 and 85 are selected so that the voltage $V_j$ at the junction 82 is less positive than $V_B-\Delta V$, where $V_B$ is the voltage at the base 66 when transistor 68 is full on. Accordingly, the input diode 72 remains reverse biased in response to the maximum light noise input signal, whereby no change in voltage appears at the output terminals 100. On the other hand, a high level input signal, such as occurs in the system of FIGURE 1 whenever a perforation passes between the lamp 28 and a photoconductor 32, causes the voltage at the emitter 56 to change by an amount $\Delta V_H$, which is greater than $\Delta V$. The change in voltage $\Delta V_H$ is greater than $V_B-V_j$ and forward biases the diode 72. The diode 72 is poled with its easy current flow direction opposed to the direction of forward base 66 current. The current previously supplied through the resistor 92 to the base 66 is diverted through the diode 72 together with reverse base 66 current, turning the transistor 68 off. The output of the circuit then is clamped at approximately ground potential by action of the clamping diode 96.

In normal operation, and because of the long RC time constant, the capacitor 70 maintains a fairly constant charge when light input signals are applied to the photoconductor 32. In the operation of a paper tape reader, however, the paper tape 14 may be stopped in a position with perforations positioned between the lamp 28 and the photoconductors 32 for a relatively long period of time. The voltage at the emitter 56 then rises in a positive direction and remains high while the tape 14 is stationary. The capacitor 70 discharges from its normal value of $V_e+V_j$ volts to a value equal to the difference between the voltage at the junction 82 and the high voltage at the emitter 56. When the tape 14 is again moved, the capacitor 70 must recharge to its normal value of $V_e+V_j$. However, because of the long RC time constant of capacitor 70 and resistor 78, the circuit would be temporarily paralyzed in the absence of the diode 80, whereby the circuit would fail to respond to the first few light input signals following commencement of tape 14 movement. The diode 80 is poled to provide a fast recharge path for the capacitor 70 to restore the normal D.-C. level at the junction 84 with minimum delay.

The above features of the circuit may be better understood by referring to FIGURE 3, which is a set of voltage waveforms. The waveforms are given alphabetic designations corresponding to like designated points in the circuit of FIGURE 2. Waveform A is the waveform of voltage appearing at the base 52 electrode. Waveforms B and C are waveforms of voltages appearing at the junction point 84 and the collector electrode 94, respectively, in the absence of the diode 80. Waveforms designated B′ and C′ are waveforms of voltages appearing at the junction 84 and the collector electrode 94, respectively, when the diode 80 is connected in the circuit.

Consider now the operation of the FIGURE 2 circuit in the absence of the diode 80. The parameters of the transistor 50 may be adjusted, for example, so that the voltage at the emitter electrode 56 is approximately −15 volts in the quiescent condition and is approximately −11 volts in response to a high level input signal. It will be understood, of course, that these and other values are given by way of illustration only. The voltage at the junction 82 (and the junction 84) normally is +4 volts, whereby the capacitor 70 normally has a charge of 19 volts. Assuming that the battery 88 has a value of +6.5 volts, the normal base 66 voltage is approximately +6 volts and the diode 72 is reverse biased by 2 volts. The transistor 68 is in saturation and the output voltage at the collector 94 is approximately +6.5 volts.

A perforation in the tape 14 is sensed at $t_1$. The voltage (A) at the base 52 and the emitter 56 rises to −11 volts. The 4 volt rise 110 in emitter 56 voltage is coupled to the junction 84 and raises the voltage at the junction 84 to approximately +8 volts. Diode 72 then is forward biased, raising the base 66 voltage to a value more positive than the voltage at emitter 74. The transistor 68 cuts off and the output voltage (C) is clamped at ground potential. The input pulse terminates at $t_2$ and the voltages at the various points in the circuit return to their initial steady state value.

A light noise signal 112 is applied to the photoconductor 32 at $t_3$. The voltage (A) at the base 52 rises in a positive direction in response to this input, but the change in bias is substantially less than that which occurred in response to the high level input signal 110. The positive change in voltage at the emitter 56 is coupled to the junction 84 but is insufficient to raise the voltage at the junction 84 to the threshold (T) of the diode 72 and the output transistor 68. The diode 72 remains reverse biased and no change in output voltage (C) is experienced.

The tape 14 is stopped at $t_4$ in such a position that a perforation is interposed between the lamp 28 and the photoconductor 32. The tape 14 remains stopped for a considerable period of time. The voltage (A) at the base 52 remains high during this interval as does the voltage at the emitter 56. The change in voltage at the emitter 56 is coupled by the capacitor 70 to the junction 84 and forward biases the diode 72, cutting off the transistor 68. The capacitor 70 begins to discharge from the initial value of 19 volts toward 15 volts and the voltage (B) decreases as the capacitor 70 discharges. The voltage (B) drops below the threshold (T) value at $t_5$. The diode 72 then becomes reverse biased and the transistor 68 switches to the full on condition. The capacitor 70, however, continues to discharge and the voltage (B) at the junction 84 continues to decrease.

The tape 14 is started in motion again at time $t_6$ and the voltage (A) at the base 52 then decreases to −15 volts. The 4 volt drop in emitter 56 voltage is coupled to the junction point 84, causing the voltage (B) to drop well below the normal value of +4 volts. The capacitor 70 cannot immediately recharge to its normal value of 19 volts because of the long RC time constant. Accordingly, the next two high level input pulses 114, 116 both cause the voltage at the junction 84 to increase approximately 4 volts, but the increase is insufficient to raise the voltage (B) at the junction 84 above the threshold value (T). The diode 72 remains reverse biased and no change is experienced in the output voltage (C). Essentially, the circuit is paralyzed during the period $t_6$ to $t_7$, and input pulses 114 and 116 applied during this period are lost. The capacitor 70 regains its normal charge at $t_8$ and the input pulse 118 applied at $t_8$ again forward biases the diode 72 and cuts off the transistor 68.

Consider now the effect of connecting the diode 80 in the FIGURE 2 circuit and refer to the waveforms designated B′ and C′. It will be noticed that the voltage waveforms B′ and C′ are identical to the waveforms B and C during the interval $t_1$ to $t_6$. The capacitor 70 begins to discharge when the tape 14 is stopped at $t_4$ and continues to discharge until the tape is again started at $t_6$. Just prior to $t_6$ when the tape 14 is started, the voltage (B') at the junction 84 is only slightly more positive than +4 volts. The voltage at the emitter 56 decreases from −11 volts to −15 volts when the tape 14 is started. This 4 volt drop is coupled by the capacitor 70 to the junction 84 and forward biases the diode 80 (the voltage at the junction 82 is +4 volts at this time). The diode 80 provides a low impedance path for recharging the capacitor 70 through the transistor 50, and the normal D.-C. voltage at the junction 84 is restored rapidly. The next high level input pulse 114 raises the voltage at the junction 84 above the threshold (T) and cuts off the transistor 68. It is thus seen that the diode 80 prevents paralysis of the circuit and thereby prevents loss of information.

What has been shown and described is an improved circuit, especially suitable for use with a photosensitive device, for amplifying the useful output of the photosensitive device and for converting to digital form input changes of greater than a predetermined amplitude. The predetermined amplitude or threshold of the circuit is adjusted to provide noise immunity by adjusting the value of the resistor 85. The output of the circuit is not a direct function of the input but rather has either a first value or a second value, depending upon whether the input signal change is greater than or less than the threshold value. The circuit has the additional advantage in that the photosensitive device can be less sensitive to light input than photosensitive devices employed in prior art circuits, because the characteristic of the photoconductor only needs to change by a predetermined amount in order to give a maximum change in the output signal of the circuit.

Although the FIGURE 2 circuit has been described and illustrated as employing PNP transistors, it will be understood that the circuit also can be implemented using other types of electron control devices. In particular, NPN transistors can be used instead of PNP transistors, provided that bias sources of the opposite polarity are used and provided further that the connections to the diodes 72 and 80 are reversed. In the event that the light input is high in the quiescent state and changes to a low value in response to sensed information, as in a system for reading printed documents, the photoconductor 32 and the resistor 62 in the input circuit can be interchanged.

What is claimed is:

1. A circuit comprising an input transistor and an output transistor of the same conductivity type each having an emitter, a collector and a base; a capacitor and a unidirectional conducting device serially connected, in the order named, between the emitter of the input transistor and the base of the output transistor with the unidirectional conducting device poled with its easy current flow direction in opposition to the direction of forward base current of the output transistor; means to apply biasing potentials to the collector, emitter and base of the output transistor for normally biasing the output transistor in the full on condition; means for applying a bias voltage at the junction of said capacitor and said unidirectional conducting device for normally reverse biasing said unidirectional conducting device by a predetermined amount; a resistor connected between the emitter of said input transistor and a point of reference potential; means connecting the collector of said input transistor to a point of reference potential; and means for applying at the base of said input transistor information signals having an amplitude greater than said predetermined amount and a polarity to forward bias said unidirectional conducting device.

2. A circuit comprising: an input transistor and an output transistor of the same conductivity type each having an emitter, a collector and a base electrode; a resistor connected between the emitter of the input transistor and a point of reference potential; means connecting the collector of said input transistor to said point of reference potential; a bias circuit connected to the base electrode of said input transistor and including a light sensitive, variable impedance device, said device being subject to undesired light signals which produce a predetermined maximum change in voltage at the emitter of said input transistor; a capacitor and a unidirectional conducting device serially connected, in the order named, between the emitter of the input transistor and the base of the output transistor, with the unidirectional conducting device poled with its easy current flow direction in opposition to the direction of forward base current in the output transistor; means applying biasing potentials to the collector, emitter and base of the output transistor for normally biasing the output transistor into heavy conduction; means for applying a bias voltage at the junction of said capacitor and said unidirectional conducting device having a value to normally reverse bias said unidirectional conducting device by an amount greater than said predetermined maximum change in voltage; and means for applying to said light sensitive device information light signals having an intensity greater than the intensity of said undesired light signals.

3. A circuit comprising: an input transistor and an output transistor each having a common electrode, an output electrode, and a control electrode; a capacitor and a first unidirectional conducting device serially connected, in the order named, between the output electrode of the input transistor and the control electrode of the output transistor, with the unidirectional conducting device poled with its easy current flow direction in opposition to the direction of forward control current in the output transistor; means for applying operating potentials to the output, common and control electrodes of the output transistor for normally biasing the output transistor into heavy condition; a resistor and a second unidirectional conducting device each having one terminal connected to the junction of the capacitor and the first unidirectional device, said second unidirectional conducting device and said first unidirectional device being poled in opposite directions with respect to current supplied at said junction; means for applying a voltage at the other terminals of said resistor and said second unidirectional device and having a value to normally reverse bias said first unidirectional conducting device by a predetermined amount; means connecting the common electrode of said input transistor to a point of reference potential; and means for applying between the control electrode and the common electrode of said input transistor information signals having an amplitude to change the voltage at the output electrode of said input transistor by an amount greater than said predetermined amount.

4. A circuit comprising: an input transistor and an output transistor each having a common electrode, an output electrode and a control electrode; means connecting the common electrode of said input transistor to a point of reference potential; a bias circuit including a light sensitive, variable impedance device connected to the control electrode of said input transistor, said light sensitive device being subject to undesired light signals which produce a predetermined maximum change in voltage at the output electrode of said input transistor; a capacitor and a first unidirectional conducting device serially connected, in the order named, between the output electrode of the input transistor and the control electrode of the output transistor, with the unidirectional conducting device poled with its easy current flow direction in opposition to the direction of forward control current in the output transistor; means for applying operating potentials to the common, output and control electrodes of the output transistor for normally biasing the output transistor in the full on condition; a resistor and a second unidirectional conducting device each having one terminal connected to the junction of the capacitor and the second unidirectional conducting device, said second unidirectional conducting device and said first unidirectional conducting device being poled in opposite directions with respect to current supplied at said junction; means for applying a bias voltage at the other terminals of said resistor and said second unidirectional device and having a value to normally reverse bias said first unidirectional device by an amount greater than said predetermined maximum change in voltage; and means for applying to said light sensitive device information light signals of greater intensity than the intensity of the undesired light signals.

5. In a reader system wherein information is recorded on a recording medium as a visible pattern having different light transmissivity than the recording medium and wherein one or more photo-diodes are positioned on one side of said medium for detecting light passing through or reflecting from said medium, said photo-diode being subject to undesired light signals due, in part, to nonuniformity of light transmissivity of the medium itself; a circuit for each photo-diode comprising: said photo-diode; a first transistor connected as an emitter follower; a bias circuit, including said photo-diode, biasing said emitter follower for class A operation; an output transistor having a control electrode; bias means connected to said control electrode for quiescently biasing said output transistor in the conducting condition; a coupling capacitor and a unidirectional conducting device connected, in the order named, between said emitter and said control electrode, said unidirectional conducting device being poled with its easy current flow direction opposing the direction of quiescent current flow at the control electrode of said output transistor; and means connected to the junction of said capacitor and said unidirectional conducting device for reverse biasing said unidirectional conducting device by an amount greater than the change in voltage at said emitter in response to said undesired light signals detected by said photo-diode.

6. In a reader system wherein information is recorded on a recording medium as a visible pattern having different light transmissivity than the recording medium and wherein one or more photo-diodes are positioned on one side of said medium for detecting light passing through or reflected from said medium, said photo-diode being subject to undesired light signals due, in part, to nonuniformity of light transmissivity of the medium itself; a circuit for each photo-diode comprising: said photo-diode; a first transistor; a bias circuit, including said photo-diode, biasing said first transistor for class A operation; an output transistor having a control electrode; bias means connected to said control electrode for quiescently biasing said output transistor in the conducting condition; a coupling capacitor and a unidirectional conducting device connected, in the order named, between the output of said first transistor and said control electrode, with the unidirectional conducting device poled with its easy current flow direction in opposition to the direction of forward control current in said output transistor; and means connected to the junction of said capacitor and said unidirectional conducting device for reverse biasing said unidirectional conducting device by an amount greater than the change in voltage at said emitter in response to said undesired light signals detected by said photo-diode.

7. In a reader system wherein information is recorded on a recording medium as a visible pattern having different light transmissivity than the recording medium and wherein one or more photo-diodes are positioned on one side of said medium for detecting light passing through or reflected from said medium, said photo-diode being subject to undesired light signals due, in part, to nonuniformity of light transmissivity of the medium itself; a circuit for each photo-diode comprising: said photo-diode; a first transistor connected as an emitter follower; a bias circuit, including said photo-diode, biasing said emitter follower for class A operation; an output transistor having a control electrode; bias means connected to said control electrode for quiescently biasing said output transistor in the conducting condition; a coupling capacitor and a unidirectional conducting device connected, in the order named, between said emitter and said control electrode, said unidirectional conducting device being poled with its easy current flow direction opposing the direction of quiescent current flow at the control electrode of said output transistor; a resistor and a second unidirectional conducting device each having one terminal connected to the junction of said capacitor and said first unidirectional conducting device, said first unidirectional conducting device and said second unidirectional conducting device being poled in opposite directions with respect to current supplied at said junction; and means for applying a bias voltage at the other terminals of said resistor and said second unidirectional conducting device and having a value to reverse bias said first unidirectional conducting device by an amount greater than the change in voltage at said emitter in response to said undesired light source detected by said photo-diode.

References Cited in the file of this patent

UNITED STATES PATENTS

| | | |
|---|---|---|
| 2,802,954 | Graham et al. | Aug. 13, 1957 |
| 3,014,138 | Moore et al. | Dec. 19, 1961 |
| 3,067,934 | Amacher et al. | Dec. 11, 1962 |